United States Patent
Hu et al.

(10) Patent No.: US 12,260,186 B2
(45) Date of Patent: Mar. 25, 2025

(54) METHOD OF GENERATING TEXT, METHOD OF TRAINING MODEL, ELECTRONIC DEVICE, AND MEDIUM

(71) Applicant: BEIJING BAIDU NETCOM SCIENCE TECHNOLOGY CO., LTD., Beijing (CN)

(72) Inventors: Zhe Hu, Beijing (CN); Jiachen Liu, Beijing (CN); Xinyan Xiao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 288 days.

(21) Appl. No.: 17/992,436

(22) Filed: Nov. 22, 2022

(65) Prior Publication Data

US 2023/0084438 A1 Mar. 16, 2023

(30) Foreign Application Priority Data

Jan. 26, 2022 (CN) .......................... 202210097054.9

(51) Int. Cl.
*G06F 40/56* (2020.01)
*G06F 40/30* (2020.01)

(52) U.S. Cl.
CPC .............. *G06F 40/56* (2020.01); *G06F 40/30* (2020.01)

(58) Field of Classification Search
CPC .................................. G06F 40/56; G06F 40/30
USPC ...................... 704/231–232, 238–240, 251
See application file for complete search history.

(56) References Cited

U.S. PATENT DOCUMENTS

2022/0414338 A1* 12/2022 Cho .................. G06F 40/30

FOREIGN PATENT DOCUMENTS

| CN | 106682192 | 5/2017 |
|---|---|---|
| CN | 110287489 | 9/2019 |
| CN | 111339781 | 6/2020 |
| CN | 111414736 | 7/2020 |
| CN | 112069309 | 12/2020 |
| CN | 113378547 | 9/2021 |
| CN | 113850291 | 12/2021 |
| CN | 113971201 | 1/2022 |

OTHER PUBLICATIONS

Office Action dated Oct. 12, 2022, issued in corresponding Chinese Patent Application No. 202210097054.9, pp. 1-6.

* cited by examiner

*Primary Examiner* — George C Monikang
(74) *Attorney, Agent, or Firm* — Pillsbury Winthrop Shaw Pittman, LLP

(57) ABSTRACT

A method of generating a text, a method of training a text generation model, an electronic device, and a storage medium, which relate to a field of a computer technology, in particular to fields of deep learning and natural language processing technologies. A specific implementation solution includes: determining a reference feature representation of a target semantic information; determining, based on the reference feature representation and at least one predetermined logical character, at least one sentence latent representation respectively corresponding to the at least one predetermined logical character; and generating a target text content based on the at least one sentence latent representation.

19 Claims, 6 Drawing Sheets

METHOD OF GENERATING TEXT, METHOD OF TRAINING MODEL, ELECTRONIC DEVICE, AND MEDIUM

This application claims priority of Chinese Patent Application No. 202210097054.9 filed on Jan. 26, 2022, which is incorporated herein in its entirety by reference.

TECHNICAL FIELD

The present disclosure relates to a field of a computer technology, in particular to fields of deep learning and natural language processing technologies. Specifically, the present disclosure relates to a method of generating a text, a method of training a text generation model, an electronic device, and a storage medium.

BACKGROUND

With a continuous innovation of the computer technology, a generation of text content is no longer limited to manual editing. It is possible to automatically generate a text such as news, academic papers, essays, etc. by using a natural language processing technology of computers.

SUMMARY

The present disclosure provides a method of generating a text, a method of training a text generation model, an electronic device, and a storage medium.

According to an aspect of the present disclosure, a method of generating a text is provided, including: determining a reference feature representation of a target semantic information; determining, based on the reference feature representation and at least one predetermined logical character, at least one sentence latent representation respectively corresponding to the at least one predetermined logical character; and generating a target text content based on the at least one sentence latent representation.

According to another aspect of the present disclosure, a method of training a text generation model is provided, including: training the text generation model by using a training sample, so as to obtain a trained text generation model, wherein the training sample includes a target sample semantic information and a sample text content; wherein the text generation model is configured to: determine a reference feature representation of a target semantic information; determine, based on the reference feature representation and at least one predetermined logical character, at least one sentence latent representation respectively corresponding to the at least one predetermined logical character; and generate a target text content based on the at least one sentence latent representation.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the methods provided by the present disclosure.

According to a sixth aspect of the present disclosure, a non-transitory computer-readable storage medium having computer instructions therein is provided, and the computer instructions are configured to cause a computer to implement the methods provided by the present disclosure.

It should be understood that content described in this section is not intended to identify key or important feature in embodiments of the present disclosure, nor is it intended to limit the scope of the present disclosure. Other feature of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

The present disclosure provides a method and an apparatus of generating a text, a method and an apparatus of training a text generation model, an electronic device, a storage medium, and a program product.

According to embodiments of the present disclosure, the method of generating the text may include: determining a reference feature representation of a target semantic information; determining, based on the reference feature representation and at least one predetermined logical character, at least one sentence latent representation respectively corresponding to the at least one predetermined logical character;

and generating a target text content based on the at least one sentence latent representation.

In the technical solution of the present disclosure, an acquisition, a storage, a use, a processing, a transmission, a provision, a disclosure, and an application of user personal information involved comply with the provisions of relevant laws and regulations, take essential confidentiality measures, and do not violate the public order and good customs. In the technical solution of the present disclosure, authorization or consent is obtained from the user before the user's personal information is obtained or collected.

Figure 1:
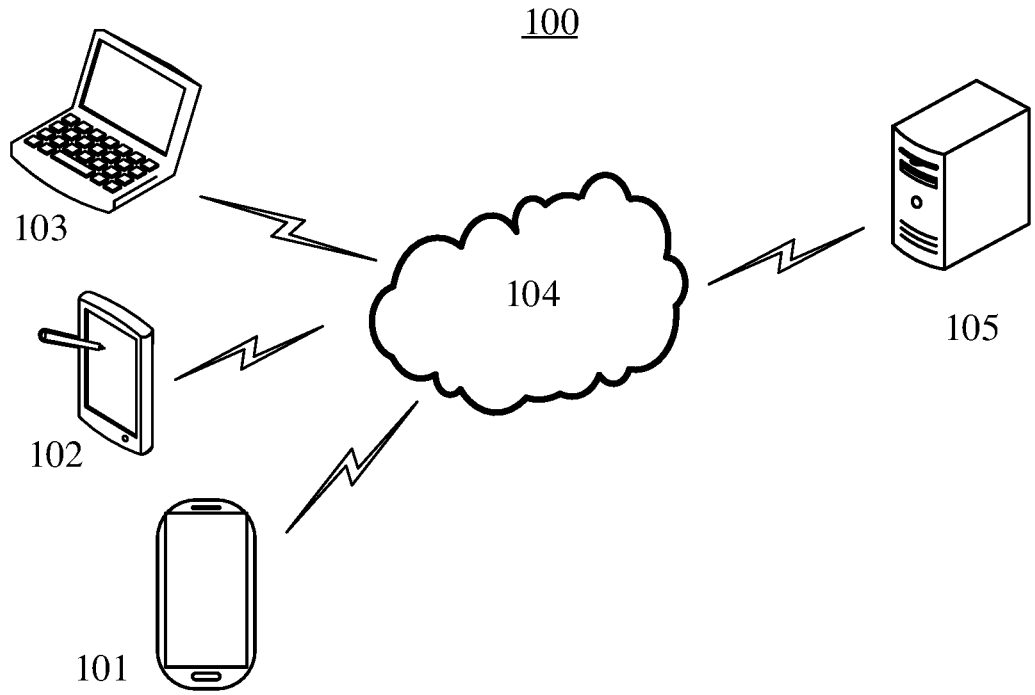
FIG. 1 schematically shows an exemplary system architecture to which a method and an apparatus of generating a text may be applied according to embodiments of the present disclosure.

FIG. 1 schematically shows an exemplary system architecture to which a method and an apparatus of generating a text may be applied according to embodiments of the present disclosure.

It should be noted that FIG. 1 is only an example of a system architecture to which embodiments of the present disclosure may be applied, so as to help those skilled in the art understand the technical content of the present disclosure, but it does not mean that embodiments of the present disclosure may not be used for other devices, systems, environments or scenarios. For example, in other embodiments, an exemplary system architecture to which a method and an apparatus of generating a text may be applied may include a terminal device, but the terminal device may implement the method and the apparatus of generating the text provided by embodiments of the present disclosure without interacting with a server.

As shown in FIG. 1, a system architecture 100 according to such embodiments may include terminal devices 101, 102 and 103, a network 104, and a server 105. The network 104 is a medium for providing a communication link between the terminal devices 101, 102, 103 and the server 105. The network 104 may include various connection types, such as wired and/or wireless communication links, and the like.

The terminal devices 101, 102, 103 may be used by a user to interact with the server 105 through the network 104 to receive or send messages and the like. The terminal devices 101, 102, 103 may be installed with various communication client applications, such as knowledge reading applications, web browser applications, search applications, instant messaging tools, email clients and/or social platform software, etc. (for example only).

The terminal devices 101, 102, 103 may be various electronic devices having display screens and supporting web browsing, including but not limited to smart phones, tablet computers, laptop computers, desktop computers, and the like.

The server 105 may be a server providing various services, such as a background management server (for example only) that provides a support for a content browsed by the user using the terminal devices 101, 102, 103. The background management server may analyze and process received data such as a user request, and feedback a processing result (such as a web page, an information, or data acquired or generated according to the user request) to the terminal devices.

It should be noted that the method of generating the text provided by embodiments of the present disclosure may generally be performed by the terminal device 101, 102 or 103. Accordingly, the apparatus of generating the text provided by embodiments of the present disclosure may be provided in the terminal device 101, 102 or 103.

Alternatively, the method of generating the text provided by embodiments of the present disclosure may generally be performed by the server 105. Accordingly, the apparatus of generating the text provided by embodiments of the present disclosure may also be provided in the server 105. The method of generating the text provided by embodiments of the present disclosure may also be performed by a server or server cluster different from the server 105 and capable of communicating with the terminal device 101, 102, 103 and/or the server 105. Accordingly, the apparatus of generating the text provided by embodiments of the present disclosure may also be provided in a server or server cluster different from the server 105 and capable of communicating with the terminal device 101, 102, 103 and/or the server 105.

For example, when a target semantic information such as a title and a keyword is input by the user, the terminal devices 101, 102, 103 may acquire the target semantic information, and then transmit the target semantic information to the server 105. The server 105 may analyze the target semantic information to determine a reference feature representation of the target semantic information; determine, based on the reference feature representation and at least one predetermined logical character, at least one sentence latent representation respectively corresponding to the at least one predetermined logical character; and generate a target text content based on the at least one sentence latent representation. Alternatively, a server or server cluster capable of communicating with the terminal devices 101, 102, 103 and/or the server 105 may analyze the target semantic information and generate a target text content.

It should be understood that the number of terminal devices, network and server in FIG. 1 is merely schematic. According to implementation needs, any number of terminal device, network and server may be provided.

It should be noted that a sequence number of each operation in the following methods is merely used to represent the operation for ease of description, and should not be regarded as indicating an execution order of each operation. Unless explicitly stated, the methods do not need to be performed exactly in the order shown.

Figure 2:
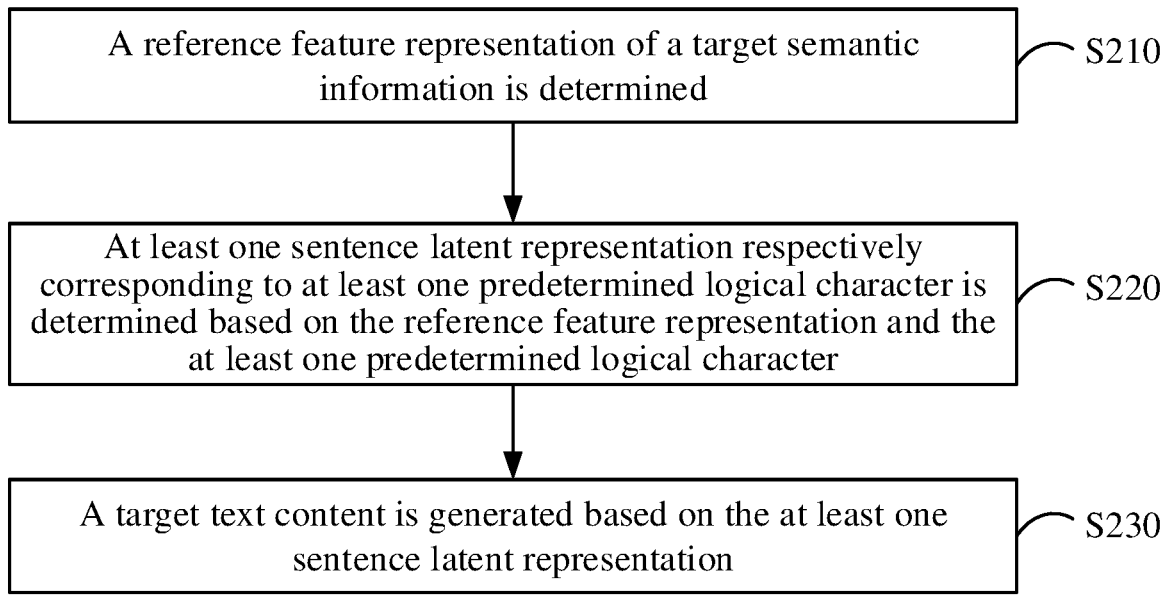
FIG. 2 schematically shows a flowchart of a method of generating a text according to embodiments of the present disclosure.

FIG. 2 schematically shows a flowchart of a method of generating a text according to embodiments of the present disclosure.

As shown in FIG. 2, the method includes operation S210 to operation S230.

In operation S210, a reference feature representation of a target semantic information is determined.

In operation S220, at least one sentence latent representation respectively corresponding to at least one predetermined logical character is determined based on the reference feature representation and the at least one predetermined logical character.

In operation S230, a target text content is generated based on the at least one sentence latent representation.

According to embodiments of the present disclosure, the target semantic information may include at least one selected from: a title, at least one keyword, an outline, an article type, or the like, but is not limited to this. The target semantic information may further include other information related to a content subject of the target text content.

According to embodiments of the present disclosure, the target semantic information may be used as a guidance information for a generation of the target text content to indicate a content subject, a central idea, etc. of the target text content. The target semantic information may be encoded to obtain the reference feature representation of the target semantic information. The reference feature representation may also be referred to as a reference feature sequence or a reference feature vector.

According to embodiments of the present disclosure, the predetermined logical character may be a preset character used as a trigger character for generating the sentence latent representation. A type of the predetermined logical character is not limited, as long as the generation of the sentence latent representation corresponding to the predetermined logical character may be triggered based on the predetermined logical character.

According to embodiments of the present disclosure, the sentence latent representation may be generated based on the reference feature representation and the predetermined logical character before the generation of each target text sentence in the target text content. The target text content may be generated based on the sentence latent representation.

According to embodiments of the present disclosure, the target text content may include academic papers, but is not limited thereto. The target text content may also be other types of articles, as long as the generated target text content matches the target semantic information. For example, the target text content is a proof text, a title of the target text content is consistent with the title in the target semantic information specified by the user, and a viewpoint of the target text content matches the outline in the target semantic information specified by the user.

According to other embodiments of the present disclosure, it is also possible to generate the target text content based on the reference feature representation. For example, by using a sequence-to-sequence network structure in a neural network generation model, such as an encoder-decoder model, the reference feature representation may be input, and the target text content may be output.

According to embodiments of the present disclosure, by generating the target text content based on the sentence latent representation and the reference feature representation instead of generating the target text content based on the reference feature representation, the sentence latent representation may be introduced to plan the content of each target text sentence in the target text content in advance based on the reference feature representation, so that logicality and smoothness between a plurality of target text sentences in the target text content may be improved.

According to embodiments of the present disclosure, for operation S210, determining the reference feature representation of the target semantic information may include the following operations.

For example, the target semantic information input by the user is received, and the reference feature representation is generated based on the target semantic information.

According to embodiments of the present disclosure, the target semantic information may be processed by an encoder in an encoder-decoder (Transformer) model to obtain the reference feature representation of the target semantic information. But the present disclosure is not limited to this. Other neural network models may also be used to process the target semantic information, as long as the network model may generate the reference feature representation based on the target semantic information.

Figure 3:
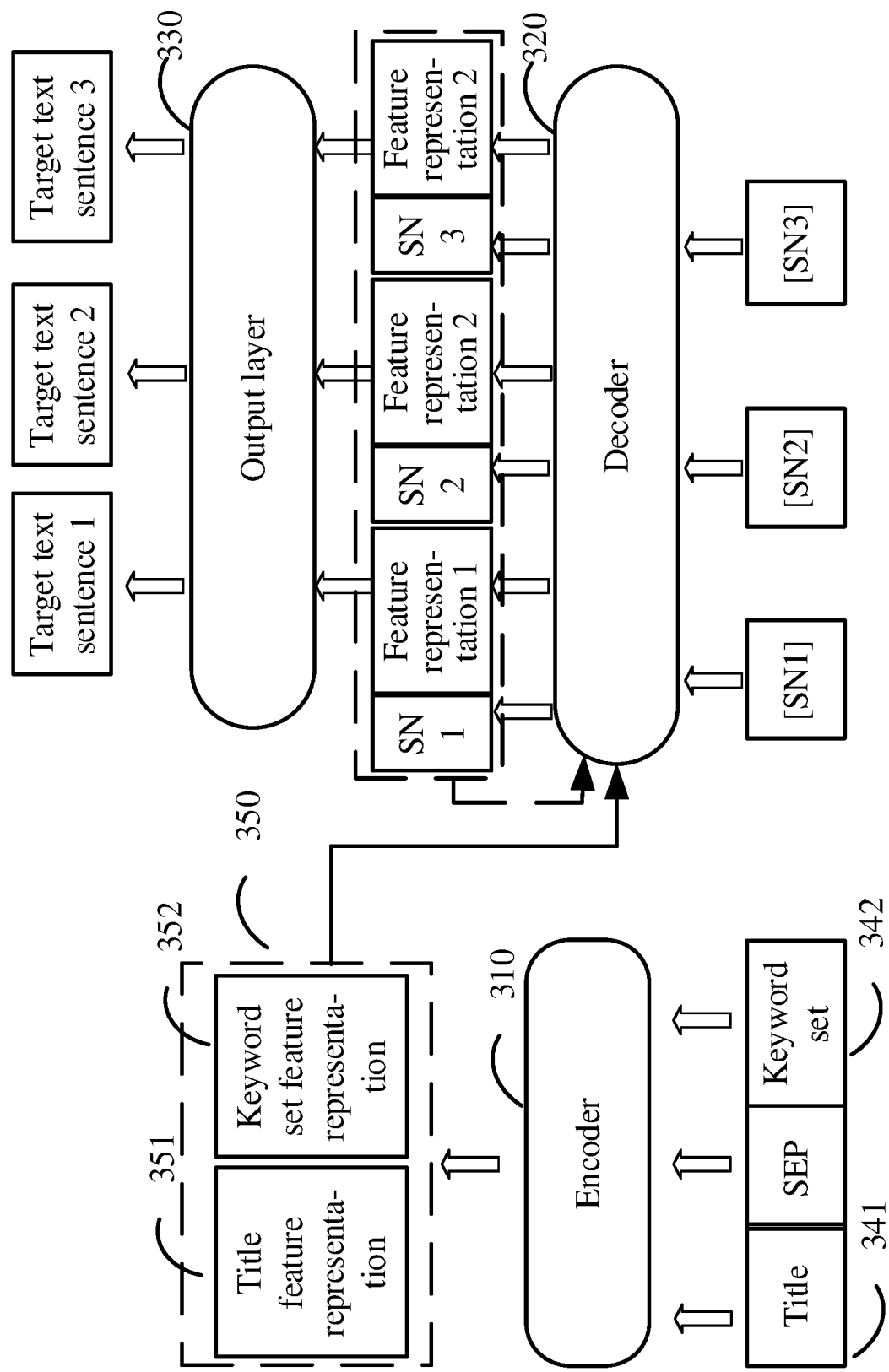
FIG. 3 schematically shows a flowchart of a method of generating a text according to other embodiments of the present disclosure.

FIG. 3 schematically shows a flowchart of a method of generating a text according to other embodiments of the present disclosure.

As shown in FIG. 3, a first text generation model may include an encoder 310, a decoder 320, and an output layer 330.

The target semantic information may include a title 341 and a keyword set 342. The keyword set may include a plurality of keywords. The target semantic information may be input into the encoder 310 of the text generation model to obtain a reference feature representation 350. The reference feature representation 350 includes a title feature representation 351 and a keyword set feature representation 352.

According to embodiments of the present disclosure, a separator SEP may be inserted between the title 341 and the keyword set 342, so as to distinguish different types of information in the target semantic information.

According to embodiments of the present disclosure, at least one sentence latent representation respectively corresponding to at least one predetermined logical character may be determined based on the reference feature representation and the at least one predetermined logical character.

As shown in FIG. 3, three predetermined logical characters [SN1], [SN2] and [SN3] and the reference feature representation 350 are input into the decoder 320, and three sentence latent representations SN1, SN2 and SN3 respectively corresponding to the three predetermined logical characters are obtained. The sentence latent representation is used to determine global semantics of a to-be-generated text sentence corresponding to the sentence latent representation.

As shown in FIG. 3, for each sentence latent representation in the at least one sentence latent representation, such as SN1, an $(i+1)^{th}$ text feature representation in the to-be-generated text sentence is determined based on the sentence latent representation SN1 and i generated text feature representations 1 in the to-be-generated text sentence corresponding to the sentence latent representation SN1 by using the decoder 320, where i is an integer greater than or equal to 0. An $(i+1)^{th}$ text content is determined based on the $(i+1)^{th}$ text feature representation by using the output layer 330. Finally, a target text sentence 1 corresponding to the to-be-generated text sentence is obtained.

For example, for a first to-be-generated text content in the to-be-generated text sentence "I want to eat a hamburger", the sentence latent representation SN1 may be processed by the decoder to determine a text feature representation of a first to-be-generated text in the to-be-generated text sentence, and the text feature representation of the first to-be-generated text content may be processed by the output layer to determine that a first text content of the target text sentence in the target text content is "I". For a second to-be-generated text content in the to-be-generated text sentence, the sentence latent representation SN1 and a text feature representation of the first text content may be processed by the decoder to determine a text feature representation of the second to-be-generated text content in the to-be-generated text sentence, and the text feature representation of the second to-be-generated text content may be processed by the output layer to determine that a second text content of the target text sentence in the target text content is "want". By analogy, it is determined that the target text sentence corresponding to the sentence latent representation SN1 is "I want to eat a hamburger".

According to embodiments of the present disclosure, after a current target text sentence is generated, the sentence latent representation SN2 corresponding to the predetermined logical character [SN2] may be obtained based on the predetermined logical character [SN2] and the reference feature representation, so as to determine a second target text sentence 2 of the target text content by using the sentence latent representation SN2. By analogy, the target text content may be determined.

According to the method of generating the text provided by embodiments of the present disclosure, by introducing a sentence-level latent representation, it is possible to globally plan a generation content of each to-be-generated text sentence, so that the logicality and coherence of the target text content may be improved.

Figure 4:
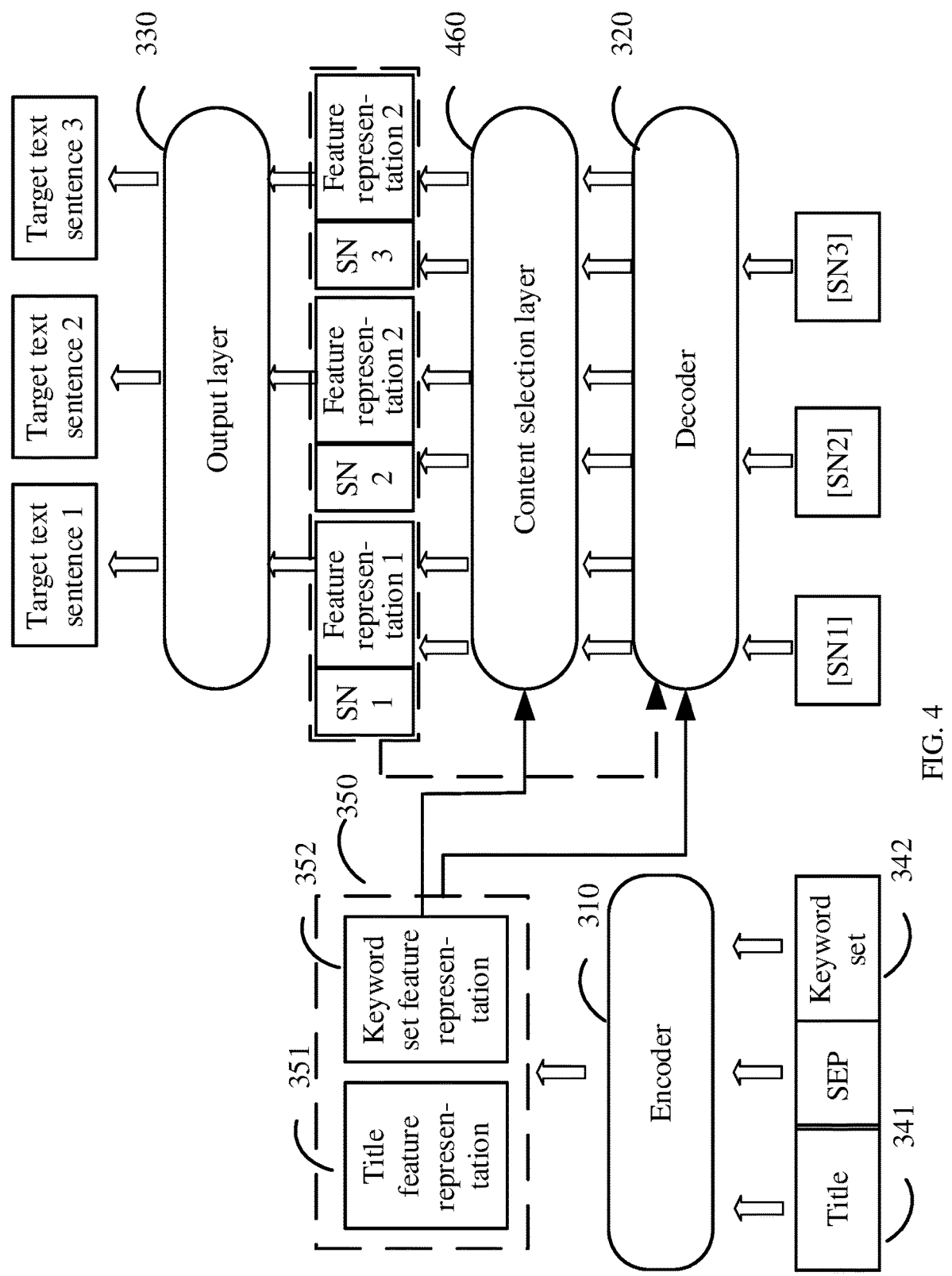
FIG. 4 schematically shows a flowchart of a method of generating a text according to other embodiments of the present disclosure.

FIG. 4 schematically shows a flowchart of a method of generating a text according to other embodiments of the present disclosure.

A network structure of a second text generation model shown in FIG. 4 is the same as the network structure of the first text generation model shown in FIG. 3, except that the second text generation model may further include a content selection layer 460. The content selection layer 460 is provided between the decoder 320 and the output layer 330.

According to embodiments of the present disclosure, the content selection layer may include a neural network layer, for example, the content selection layer may include a fully connected layer.

As shown in FIG. 4, generating a sentence latent representation according to a predetermined logical character by using the second text generation model may include the following operations.

For example, for each predetermined logical character in at least one predetermined logical character, an initial sentence latent representation corresponding to the predetermined logical character may be generated based on the reference feature representation 350 and the predetermined logical character, for example, three predetermined logical characters [SN1], [SN2] and [SN3], by using the decoder 320. The sentence latent representation, for example, three sentence latent representations SN1, SN2 and SN3 respectively corresponding to the three predetermined logical characters [SN1], [SN2] and [SN3], may be determined based on the initial sentence latent representation by using the content selection layer 460. But the present disclosure is not limited to this. The sentence latent representations may also be determined based on the initial sentence latent representation and an auxiliary selection feature representation.

According to embodiments of the present disclosure, the auxiliary selection feature representation may be obtained based on the reference feature representation 350. For example, the auxiliary selection feature representation may include the keyword set feature representation 352, but is not limited thereto. The auxiliary selection feature representation may further include the title feature representation 351.

As shown in FIG. 4, performing the method of generating the text by using the second text generation model is the same as performing the method of generating the text by using the first text generation model shown in FIG. 3, except that for each sentence latent representation in the at least one sentence latent representation, an $(i+1)^{th}$ text feature representation in the to-be-generated text sentence is determined based on the sentence latent representation and i generated target text feature representations 1 in the to-be-generated text sentence corresponding to the sentence latent representation by using the decoder 320; an $(i+1)^{th}$ target text feature representation is determined based on the $(i+1)^{th}$ text feature representation and the auxiliary selection feature representation by using the content selection layer 460; an $(i+1)^{th}$ text content is determined based on the $(i+1)^{th}$ target text feature representation by using the output layer 330; and finally a target text sentence corresponding to the to-be-generated text sentence, such as a target text sentence 1, a target text sentence 2 and a target text sentence 3 may be obtained.

According to embodiments of the present disclosure, the content selection layer may be used to process the $(i+1)^{th}$ text feature representation in the to-be-generated text sentence output by the decoder and the auxiliary selection feature representation, so as to determine the $(i+1)^{th}$ target text feature representation, so that the output layer may determine the $(i+1)^{th}$ text content based on the $(i+1)^{th}$ target text feature representation. In this way, a keyword to be contained in the current to-be-generated text sentence may be determined using the content selection layer and the auxiliary selection representation while determining the global semantics of the current to-be-generated text sentence by using the sentence latent representation, so that the target text content may conform to the semantics specified by the user and contain the keyword specified by the user.

Figure 5:
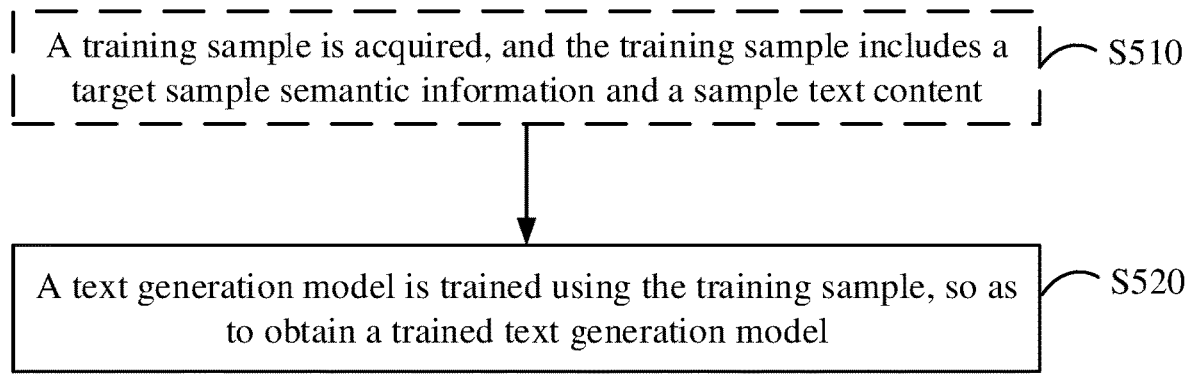
FIG. 5 schematically shows a flowchart of a method of training a text generation model according to embodiments of the present disclosure.

FIG. 5 schematically shows a flowchart of a method of training a text generation model according to embodiments of the present disclosure.

As shown in FIG. 5, the method includes operation S510 to operation S520.

In operation S510, a training sample is acquired, and the training sample includes a target sample semantic information and a sample text content.

In operation S520, a text generation model is trained using the training sample, so as to obtain a trained text generation model.

According to embodiments of the present disclosure, the text generation model may be used to: determine a reference feature representation of a target semantic information; determine, based on the reference feature representation and at least one predetermined logical character, at least one sentence latent representation respectively corresponding to the at least one predetermined logical character; and generate a target text content based on the at least one sentence latent representation.

According to embodiments of the present disclosure, the method of training the text generation model may include operation S510 and operation S520, but is not limited thereto. The method of training the text generation model may further include operation S520.

According to embodiments of the present disclosure, the text generation model may be used to determine, based on the reference feature representation and at least one predetermined logical character, at least one sentence latent representation respectively corresponding to the at least one predetermined logical character; and generate a target text content based on the at least one sentence latent representation. By generating the target text content based on the target semantic information using the trained text generation model, the logicality and coherence of the target text content may be improved.

According to embodiments of the present disclosure, the method of training the text generation model may include the following operations.

For example, a sample reference feature representation of a target sample semantic information may be determined. The target sample semantic information may include a sample title and at least one sample keyword. The sample reference feature representation and at least one predetermined logical character may be processed by the text generation model, so as to obtain at least one sample sentence latent representation respectively corresponding to the at least one predetermined logical character. For each sample sentence latent representation in the at least one sample sentence latent representation, a prediction keyword information may be obtained based on the sample sentence latent representation according to a bag-of-words prediction method. The trained text generation model may be obtained using the prediction keyword information and a label. The label is generated based on a sample text content, and the label indicates a keyword information in a sample text sentence corresponding to the sample sentence latent representation in the sample text content.

According to embodiments of the present disclosure, the text generation model may include an encoder, a decoder, and an output layer. The encoder may be used to process the target sample semantic information to obtain the sample reference feature representation. The at least one predetermined logical character and the sample reference feature representation may be input into the decoder to obtain at least one sample sentence latent representation respectively corresponding to the at least one predetermined logical character. However, the present disclosure is not limited thereto. The text generation model may include an encoder, a decoder, a content selection layer, and an output layer. The encoder may be used to process the target sample semantic information to obtain the sample reference feature representation. The at least one predetermined logical character and the sample reference feature representation may be input into the decoder to obtain at least one initial sample sentence latent representation respectively corresponding to the at least one predetermined logical character, and the at least one initial sample sentence latent representation may be processed by the content selection layer to determine at least one sample sentence latent representation respectively corresponding to the at least one initial sample sentence latent representation.

Figure 6:
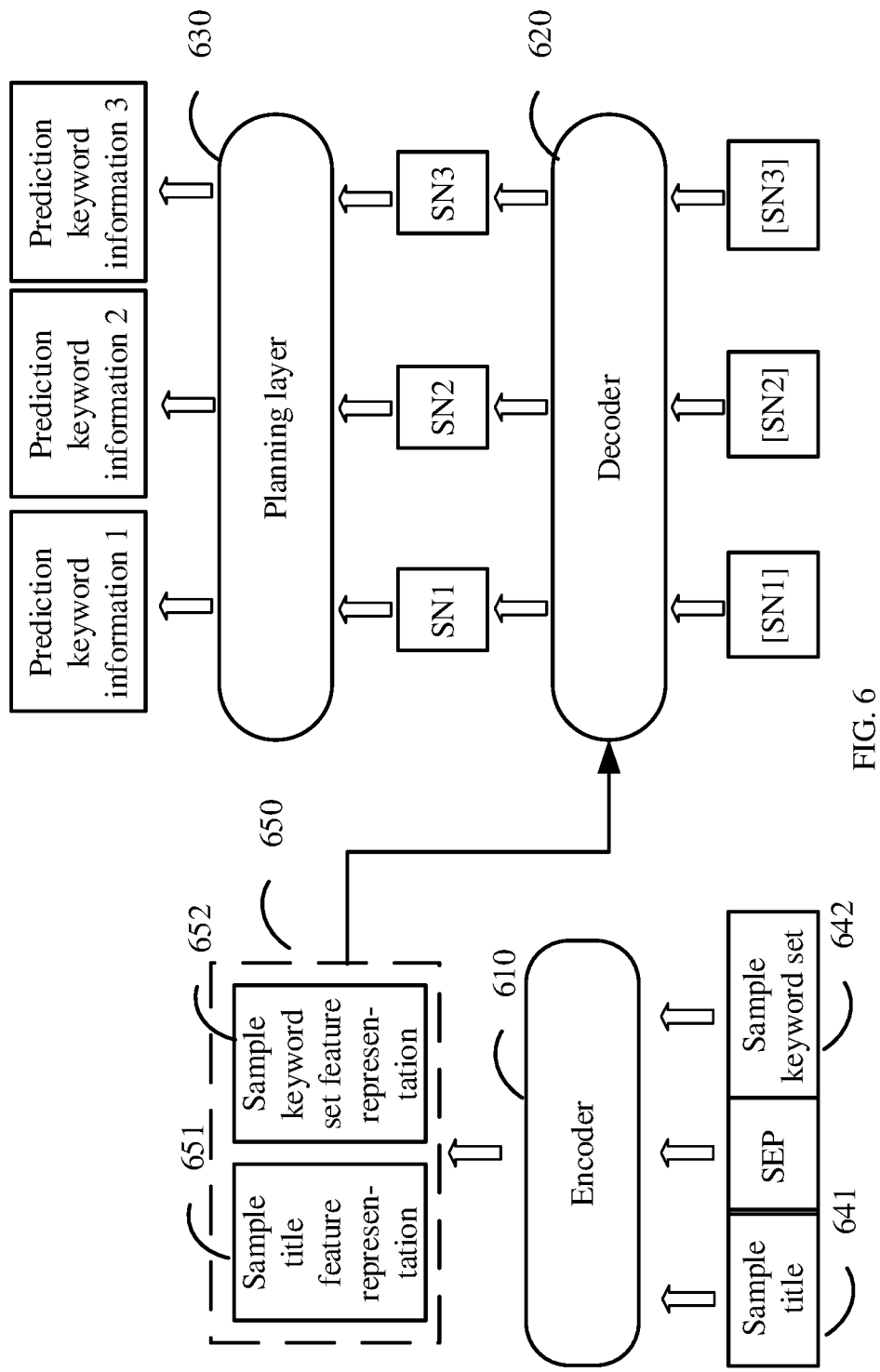
FIG. 6 schematically shows a flowchart of a method of training a text generation model according to other embodiments of the present disclosure.

FIG. 6 schematically shows a flowchart of a method of training a text generation model according to other embodiments of the present disclosure.

As shown in FIG. 6, a target sample semantic information may include a sample title 641 and a sample keyword set 642. The sample keyword set may include a plurality of sample keywords. The target sample semantic information may be input into an encoder 610 of the text generation model to obtain a sample reference feature representation 650. The sample reference feature representation 650 may include a sample title feature representation 651 and a sample keyword set feature representation 652.

The sample reference feature representation and a predetermined logical character, for example, three predetermined logical characters [SN1], [SN2] and [SN3], may be processed by a decoder 620 of the text generation model, so as to obtain at least one sample sentence latent representation, for example, three sentence latent representations SN1, SN2 and SN3 respectively corresponding to the three predetermined logical characters [SN1], [SN2] and [SN3].

For each sample sentence latent representation in at least one sample sentence latent representation, a prediction keyword information may be obtained based on the sample sentence latent representation according to a bag-of-words prediction method by using a planning layer 630. Finally, for example, a prediction keyword information 1, a prediction keyword information 2, and a prediction keyword information 3 may be obtained. The text generation model may be trained using the prediction keyword information and a label, so as to obtain a trained text generation model. The label is generated based on the sample text content, and the label indicates a keyword information in the sample text sentence corresponding to the sample sentence latent representation in the sample text content, such as a plurality of sample keywords in the sample keyword set.

According to embodiments of the present disclosure, the prediction keyword information and the label may be input into a loss function, for example, including but not limited to a cross-entropy loss function, so as to obtain a loss value. A parameter of the text generation model may be adjusted until the loss value converges. The text generation model when the loss value converges is determined as the trained text generation model.

According to embodiments of the present disclosure, the planning layer may include a neural network layer, such as a fully connected layer.

According to embodiments of the present disclosure, a bag-of-words (BOW) prediction method may be used to process a sample sentence latent representation used to represent a global semantic information of a to-be-generated text sentence, so as to determine a prediction keyword information in the sample sentence latent representation.

According to the method of training the text generation model provided by embodiments of the present disclosure, by adjusting the parameter of the text generation model, the sentence latent representation generated by the trained text generation model may accurately control the semantic information matched with the target semantic information, so that a generation quality of the target text content may be improved effectively.

Figure 7:
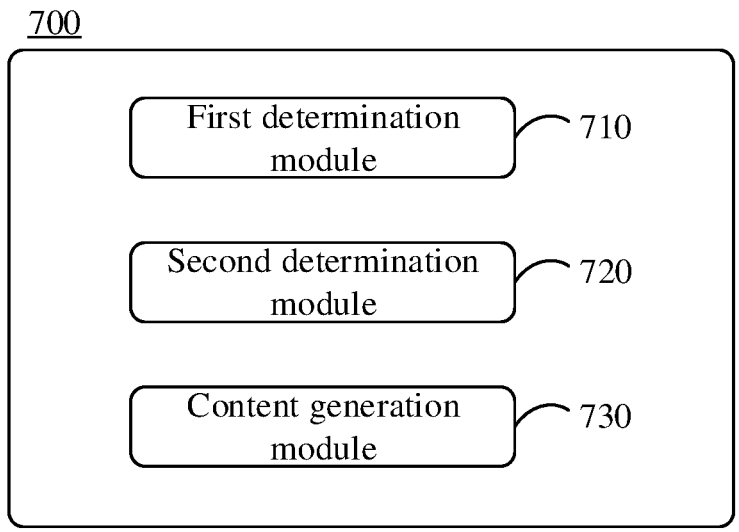
FIG. 7 schematically shows a block diagram of an apparatus of generating a text according to embodiments of the present disclosure.

FIG. 7 schematically shows a block diagram of an apparatus of generating a text according to embodiments of the present disclosure.

As shown in FIG. 7, an apparatus 700 of generating a text may include a first determination module 710, a second determination module 720, and a content generation module 730.

The first determination module 710 is used to determine a reference feature representation of a target semantic information.

The second determination module 720 is used to determine, based on the reference feature representation and at least one predetermined logical character, at least one sentence latent representation respectively corresponding to the at least one predetermined logical character.

The content generation module 730 is used to generate a target text content based on the at least one sentence latent representation.

According to embodiments of the present disclosure, the generation module may include a first feature representation determination unit and a first text content determination unit.

The first feature representation determination unit is used to determine, for each sentence latent representation in the at least one sentence latent representation, an $(i+1)^{th}$ text feature representation in a to-be-generated text sentence by using the sentence latent representation and i generated text feature representations in the to-be-generated text sentence. The to-be-generated text sentence is a text sentence corresponding to the sentence latent representation, and i is an integer greater than or equal to 0.

The first text content determination unit is used to determine an $(i+1)^{th}$ text content based on the $(i+1)^{th}$ text feature representation.

According to embodiments of the present disclosure, the generation module may include a second feature representation determination unit, a third feature representation determination unit, and a second text content determination unit.

The second feature representation determination unit is used to determine, for each sentence latent representation in the at least one sentence latent representation, an $(i+1)^{th}$ text feature representation in a to-be-generated text sentence by using the sentence latent representation and i generated target text feature representations in the to-be-generated text sentence. The to-be-generated text sentence is a text sentence corresponding to the sentence latent representation, and i is an integer greater than or equal to 0.

The third feature representation determination unit is used to determine an $(i+1)^{th}$ target text feature representation based on the $(i+1)^{th}$ text feature representation and an auxiliary selection feature representation. The auxiliary selection feature representation is obtained based on the reference feature representation.

The second text content determination unit is used to determine an $(i+1)^{th}$ text content based on the $(i+1)^{th}$ target text feature representation.

According to embodiments of the present disclosure, the third feature representation determination unit may include a first latent representation determination sub-unit and a second latent representation determination sub-unit.

The first latent representation determination sub-unit is used to generate, for each predetermined logical character in the at least one predetermined logical character, an initial sentence latent representation corresponding to the predetermined logical character, by using the reference feature representation and the predetermined logical character.

The second latent representation determination sub-unit is used to determine the sentence latent representation based on the initial sentence latent representation.

According to embodiments of the present disclosure, the apparatus of generating the text may further include a feature representation generation module.

The feature representation generation module is used to generate the reference feature representation based on the target semantic information. The target semantic information includes a title and at least one keyword.

Figure 8:
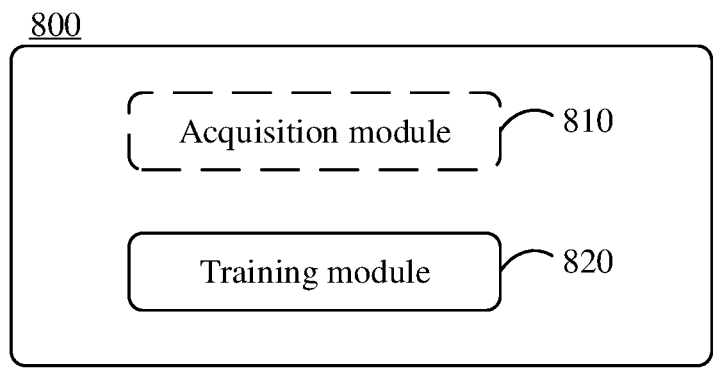
FIG. 8 schematically shows a block diagram of an apparatus of training a text generation model according to embodiments of the present disclosure.

FIG. 8 schematically shows a block diagram of an apparatus of training a text generation model according to embodiments of the present disclosure.

As shown in FIG. 8, an apparatus 800 of training a text generation model may include an acquisition module 810 and a training module 820.

The acquisition module 810 is used to acquire a training sample. The training sample includes a target sample semantic information and a sample text content.

The training module 820 is used to train the text generation model by using the training sample, so as to obtain a trained text generation model.

According to embodiments of the present disclosure, the text generation model may be used to: determine a reference feature representation of a target semantic information; determine, based on the reference feature representation and at least one predetermined logical character, at least one sentence latent representation respectively corresponding to the at least one predetermined logical character; and generate a target text content based on the at least one sentence latent representation.

According to embodiments of the present disclosure, the apparatus of training the text generation model may include an acquisition module and a training module. However, the present disclosure is not limited thereto, and the apparatus of training the text generation model may include a training module.

According to embodiments of the present disclosure, the training module may include a sample feature representation determination unit, a sample latent representation determination unit, a prediction information determination unit, and a training unit.

The sample feature representation determination unit is used to determine a sample reference feature representation of the target sample semantic information. The target sample semantic information includes a sample title and at least one sample keyword.

The sample latent representation determination unit is used to process the sample reference feature representation and at least one predetermined logical character by using the text generation model, so as to obtain at least one sample sentence latent representation respectively corresponding to the at least one predetermined logical character.

The prediction information determination unit is used to obtain a prediction keyword information for each sample sentence latent representation in the at least one sample sentence latent representation based on the sample sentence latent representation according to a bag-of-words prediction method.

The training unit is used to train the text generation model by using the prediction keyword information and a label, so as to obtain the trained text generation model. The label is generated based on the sample text content, and the label indicates a keyword information in a sample text sentence corresponding to the sample sentence latent representation in the sample text content.

According to embodiments of the present disclosure, the present disclosure further provides an electronic device, a readable storage medium, and a computer program product.

According to embodiments of the present disclosure, an electronic device is provided, including: at least one processor; and a memory communicatively connected to the at least one processor, the memory stores instructions executable by the at least one processor, and the instructions, when executed by the at least one processor, cause the at least one processor to implement the methods provided by embodiments of the present disclosure.

According to embodiments of the present disclosure, a non-transitory computer-readable storage medium having computer instructions therein is provided, and the computer instructions are used to cause a computer to implement the methods provided by embodiments of the present disclosure.

According to embodiments of the present disclosure, a computer program product containing a computer program is provided, and the computer program, when executed by a processor, causes the processor to implement the methods provided by embodiments of the present disclosure.

Figure 9:
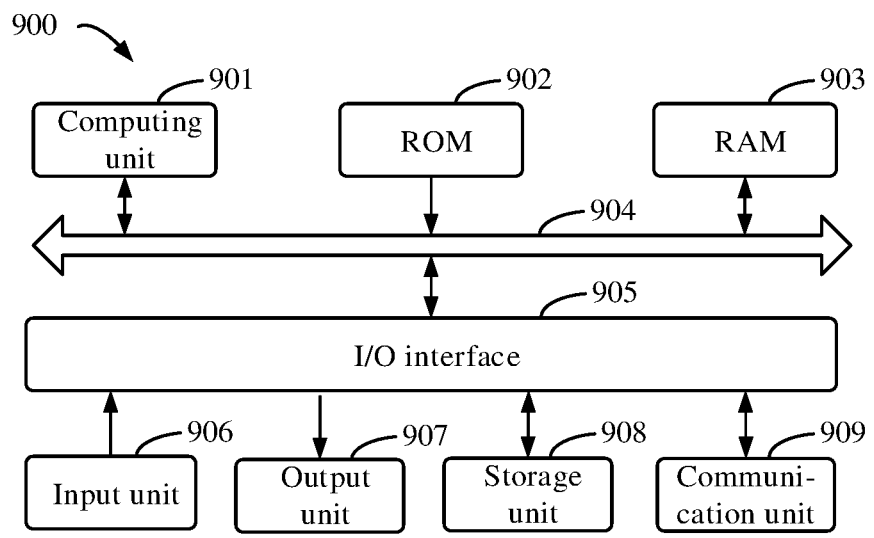
FIG. 9 schematically shows a block diagram of an electronic device suitable for implementing a method of generating a text according to embodiments of the present disclosure.

FIG. 9 schematically shows a block diagram of an exemplary electronic device 900 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the electronic device 900 includes a computing unit 901 which may perform various appropriate actions and processes according to a computer program stored in a read only memory (ROM) 902 or a computer program loaded from a storage unit 908 into a random access memory (RAM) 903. In the RAM 903, various programs and data necessary for an operation of the electronic device 900 may also be stored. The computing unit 901, the ROM 902 and the RAM 903 are connected to each other through a bus 904. An input/output (I/O) interface 905 is also connected to the bus 904.

A plurality of components in the electronic device 900 are connected to the I/O interface 905, including: an input unit 906, such as a keyboard, or a mouse; an output unit 907, such as displays or speakers of various types; a storage unit 908, such as a disk, or an optical disc; and a communication unit 909, such as a network card, a modem, or a wireless communication transceiver. The communication unit 909 allows the electronic device 900 to exchange information/data with other devices through a computer network such as Internet and/or various telecommunication networks.

The computing unit 901 may be various general-purpose and/or dedicated processing assemblies having processing and computing capabilities. Some examples of the computing unit 901 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 901 executes various methods and steps described above, such as the method of generating the text or the method of training the text generation model. For example, in some embodiments, the method of generating the text or the method of training the text generation model may be implemented as a computer software program which is tangibly embodied in a machine-readable medium, such as the storage unit 908. In some embodiments, the computer program may be partially or entirely loaded and/or installed in the electronic device 900 via the ROM 902 and/or the communication unit 909. The computer program, when loaded in the RAM 903 and executed by the computing unit 901, may execute one or more steps in the method of generating the text or the method of training the text generation model described above. Alternatively, in other embodiments, the computing unit 901 may be configured to perform the method of generating the text or the method of training the text generation model by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, speech input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of generating a text, the method comprising:
    determining a reference feature representation of a target semantic information;
    determining, based on the reference feature representation and at least one predetermined logical character, at least one sentence latent representation respectively corresponding to the at least one predetermined logical character, wherein the determining the at least one sentence latent representation respectively corresponding to the at least one predetermined logical character comprises:
        generating, for each predetermined logical character in the at least one predetermined logical character, an initial sentence latent representation corresponding to the predetermined logical character, by using the reference feature representation and the predetermined logical character, and
        determining the at least one sentence latent representation based on the initial sentence latent representation; and
    generating a target text content based on the at least one sentence latent representation.

2. The method according to claim 1, wherein the generating a target text content based on the at least one sentence latent representation comprises:
    determining, for each sentence latent representation in the at least one sentence latent representation, an $(i+1)^{th}$ text feature representation in a to-be-generated text sentence by using the sentence latent representation and i generated text feature representations in the to-be-generated text sentence, wherein the to-be-generated text sentence is a text sentence corresponding to the sentence latent representation, and i is an integer greater than or equal to 0; and
    determining an $(i+1)^{th}$ text content based on the $(i+1)^{th}$ text feature representation.

3. The method according to claim 1, wherein the generating a target text content based on the at least one sentence latent representation comprises:
    determining, for each sentence latent representation in the at least one sentence latent representation, an $(i+1)^{th}$ text feature representation in a to-be-generated text sentence by using the sentence latent representation and i generated target text feature representations in the to-be-generated text sentence, wherein the to-be-generated text sentence is a text sentence corresponding to the sentence latent representation, and i is an integer greater than or equal to 0;
    determining an $(i+1)^{th}$ target text feature representation based on the $(i+1)^{th}$ text feature representation and an auxiliary selection feature representation, wherein the auxiliary selection feature representation is obtained based on the reference feature representation; and
    determining an $(i+1)^{th}$ text content based on the $(i+1)^{th}$ target text feature representation.

4. The method according to claim 1, further comprising generating the reference feature representation based on the target semantic information, wherein the target semantic information comprises a title and at least one keyword.

5. The method according to claim 2, further comprising generating the reference feature representation based on the target semantic information, wherein the target semantic information comprises a title and at least one keyword.

6. The method according to claim 3, further comprising generating the reference feature representation based on the target semantic information, wherein the target semantic information comprises a title and at least one keyword.

7. A method of training a text generation model, the method comprising training the text generation model by using a training sample, so as to obtain a trained text generation model, wherein the training sample comprises a target sample semantic information and a sample text content, wherein the text generation model is configured to implement the method according to claim 1.

8. The method according to claim 7, wherein the training the text generation model by using a training sample, so as to obtain a trained text generation model comprises:
    determining a sample reference feature representation of the target sample semantic information, wherein the target sample semantic information comprises a sample title and at least one sample keyword;
    processing the sample reference feature representation and at least one predetermined logical character by using the text generation model, so as to obtain at least one sample sentence latent representation respectively corresponding to the at least one predetermined logical character;
    obtaining a prediction keyword information for each sample sentence latent representation in the at least one sample sentence latent representation based on the sample sentence latent representation according to a bag-of-words prediction method; and
    training the text generation model by using the prediction keyword information and a label, so as to obtain the trained text generation model, wherein the label is generated based on the sample text content, and the label indicates a keyword information in a sample text sentence corresponding to the sample sentence latent representation in the sample text content.

9. An electronic device, comprising:
    at least one processor; and
    a memory communicatively connected to the at least one processor, wherein the memory stores instructions executable by the at least one processor, and the instructions, when executed by the at least one processor, cause the at least one processor to at least:
    determine a reference feature representation of a target semantic information;
    determine, based on the reference feature representation and at least one predetermined logical character, at least one sentence latent representation respectively corresponding to the at least one predetermined logical character, wherein determination of the at least one sentence latent representation respectively corresponding to the at least predetermined logical character comprises:
        generation, for each predetermined logical character in the at least one predetermined logical character, an initial sentence latent representation corresponding to the predetermined logical character, by using the reference feature representation and the predetermined logical character, and
        determination of the at least one sentence latent representation based on the initial sentence latent representation; and
    generate a target text content based on the at least one sentence latent representation.

10. The electronic device according to claim 9, wherein the electronic device is further configured to:
  determine, for each sentence latent representation in the at least one sentence latent representation, an $(i+1)^{th}$ text feature representation in a to-be-generated text sentence by using the sentence latent representation and i generated text feature representations in the to-be-generated text sentence, wherein the to-be-generated text sentence is a text sentence corresponding to the sentence latent representation, and i is an integer greater than or equal to 0; and
  determine an $(i+1)^{th}$ text content based on the $(i+1)^{th}$ text feature representation.

11. The electronic device according to claim 9, wherein the electronic device is further configured to:
  determine, for each sentence latent representation in the at least one sentence latent representation, an $(i+1)^{th}$ text feature representation in a to-be-generated text sentence by using the sentence latent representation and i generated target text feature representations in the to-be-generated text sentence, wherein the to-be-generated text sentence is a text sentence corresponding to the sentence latent representation, and i is an integer greater than or equal to 0;
  determine an $(i+1)^{th}$ target text feature representation based on the $(i+1)^{th}$ text feature representation and an auxiliary selection feature representation, wherein the auxiliary selection feature representation is obtained based on the reference feature representation; and
  determine an $(i+1)^{th}$ text content based on the $(i+1)^{th}$ target text feature representation.

12. The electronic device according to claim 9, wherein the electronic device is further configured to generate the reference feature representation based on the target semantic information, wherein the target semantic information comprises a title and at least one keyword.

13. An electronic device, comprising:
  at least one processor; and
  a memory communicatively connected to the at least one processor, wherein the memory stores instructions executable by the at least one processor, and the instructions, when executed by the at least one processor, cause the at least one processor to at least train a text generation model by using a training sample, so as to obtain a trained text generation model, wherein the training sample comprises a target sample semantic information and a sample text content and wherein the text generation model is configured to implement the determining and generating functions of claim 9.

14. A non-transitory computer-readable storage medium having computer instructions therein, the computer instructions configured to cause a computer system to at least:
  determine a reference feature representation of a target semantic information;
  determine, based on the reference feature representation and at least one predetermined logical character, at least one sentence latent representation respectively corresponding to the at least one predetermined logical character, wherein determination of the at least one sentence latent representation respectively corresponding to the at least predetermined logical character comprises:
    generation, for each predetermined logical character in the at least one predetermined logical character, an initial sentence latent representation corresponding to the predetermined logical character, by using the reference feature representation and the predetermined logical character, and
    determination of the at least one sentence latent representation based on the initial sentence latent representation; and
  generate a target text content based on the at least one sentence latent representation.

15. The non-transitory computer-readable storage medium according to claim 14, wherein the computer instructions are further configured to cause the computer system to:
  determine, for each sentence latent representation in the at least one sentence latent representation, an $(i+1)^{th}$ text feature representation in a to-be-generated text sentence by using the sentence latent representation and i generated text feature representations in the to-be-generated text sentence, wherein the to-be-generated text sentence is a text sentence corresponding to the sentence latent representation, and i is an integer greater than or equal to 0; and
  determine an $(i+1)^{th}$ text content based on the $(i+1)^{th}$ text feature representation.

16. The non-transitory computer-readable storage medium according to claim 14, wherein the computer instructions are further configured to cause the computer system to:
  determine, for each sentence latent representation in the at least one sentence latent representation, an $(i+1)^{th}$ text feature representation in a to-be-generated text sentence by using the sentence latent representation and i generated target text feature representations in the to-be-generated text sentence, wherein the to-be-generated text sentence is a text sentence corresponding to the sentence latent representation, and i is an integer greater than or equal to 0;
  determine an $(i+1)^{th}$ target text feature representation based on the $(i+1)^{th}$ text feature representation and an auxiliary selection feature representation, wherein the auxiliary selection feature representation is obtained based on the reference feature representation; and
  determine an $(i+1)^{th}$ text content based on the $(i+1)^{th}$ target text feature representation.

17. The non-transitory computer-readable storage medium according to claim 14, wherein the computer instructions are further configured to cause the computer system to generate the reference feature representation based on the target semantic information, wherein the target semantic information comprises a title and at least one keyword.

18. The non-transitory computer-readable storage medium according to claim 15, wherein the computer instructions are further configured to cause the computer system to generate the reference feature representation based on the target semantic information, wherein the target semantic information comprises a title and at least one keyword.

19. A non-transitory computer-readable storage medium having computer instructions therein, the computer instructions configured to cause a computer system to at least train a text generation model by using a training sample, so as to obtain a trained text generation model, wherein the training sample comprises a target sample semantic information and a sample text content and wherein the text generation model is configured to implement the determining and generating functions of claim 14.

* * * * *